Sept. 4, 1934.     L. RADO     1,972,314

PROCESS FOR THE PRODUCTION OF SENSITIZED FILMS

Filed Oct. 12, 1929

Inventor:
Leopold Rado
By Watson E. Coleman

Patented Sept. 4, 1934

1,972,314

UNITED STATES PATENT OFFICE 1,972,314

PROCESS FOR THE PRODUCTION OF SENSITIZED FILMS

Leopold Rado, Berlin-Wannsee, Germany

Application October 12, 1929, Serial No. 399,299
In Germany October 17, 1928

6 Claims. (Cl. 95—8)

My invention relates to a process for the production of sensitized films and copying or duplicating materials. By the processes already disclosed, the production of sensitized films and the like is effected by first preparing the light-sensitive layers as emulsions in a liquid condition and then applying them to a supporting sub-layer where they solidify. Such emulsions are, for the most part, produced by the use of such materials as become readily brittle, after solidifying, as, for example, gelatines etc. As a result of this method, the light-sensitive layers readily detach themselves from their carrier layers and the films etc., so produced are rendered unfit for use.

This drawback is remedied according to the present invention by arranging that the light-sensitive layers are prepared in the form of skins (films) of cellulose-derivatives, more particularly cellulose-hydrates, which are then attached to the carrier sub-layer by a fixative agent. Such cellulose skins, even though of very slight thickness, possess a very high resistance to tearing so that the light-sensitive films produced from them, can meet every mechanical stress put on them without detaching themselves from their carrier layers.

In a further developed form for realizing the invention, thin foils of metal and more particularly of aluminium, which may in certain cases be strengthened by paper, woven fabrics or the like, are made use of as reflector carrier layers for the light-sensitive films. When such metallic foils are employed as reflector sublayers, it becomes possible to coat both sides of the carrier layer with light-sensitive films and to employ them as image surfaces. The life of the films is thereby also substantially raised without any appreciable increase in thickness. The reflector sub-layer may have any thickness desired, as it is inserted in the neutral zone of the film which is made up of several layers. If, for example, the metal foil has a thickness of 0.009 mm. and if the thickness of the light-sensitive films attached to both sides of said metal foil is 0.05 mm., the entire thickness of the film will be 0.1 mm. which is completely adequate for the stability (endurance) of the film.

Cellulose-hydrates are, owing to their suppleness and their tearing-resistance, specially suitable for the preparation of light-sensitive films. But such cellulose hydrate films have the undesirable property of being extremely hygroscopic and of also becoming in course of time very brittle when exposed to the atmosphere. To remedy this defect, which is due to the softening agents contained in the hydrate films, and more specifically to glycerine-bound water, these softening agents in the cellulose-hydrate films, are, according to the invention and after the image is developed, enclosed by a coating of nitro-cellulose lac, celluloid-solution or the like and thus protected from atmospheric influences. It is advisable to apply these coatings in such a manner that the cutting edges of the film etc., are also covered.

In the drawing which forms a part of this application I have shown some embodiments of my invention by way of example.

Figure 1:
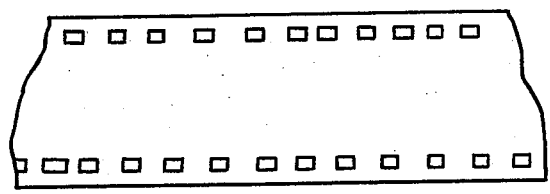
Fig. 1 shows in a plan view the usual form of a film which is shown in section in Fig. 2.
Figure 2:
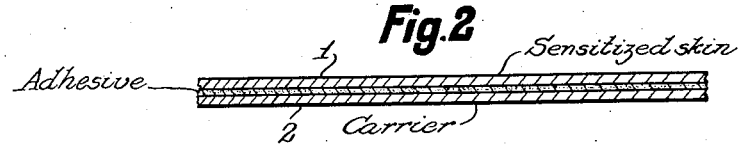
Figure 3:
Fig. 3 is a section of a modified form of a film.

The sensitized skin 1 prepared according to my present invention is attached to a carrier 2 by means of a suitable fixative substance (see Fig. 2). If a metal foil is used as a reflector, the metal foil 3 may be covered on both sides by sensitized skins 4 and 5 as shown in Fig. 3.

What I claim as my invention and desire to secure by Letters Patent of the United States, is:

1. As an article of manufacture, a photographic film consisting of a sensitized cellulose hydrate mass and a tenuous metal foil adhesively attached thereto.

2. As an article of manufacture, a photographic film consisting of a cellulose hydrate foil of high tensile strength impregnated in its mass with a light sensitive medium, and a tenuous metal foil adhesively attached thereto.

3. As an article of manufacture, a photographic film consisting of a tenuous metal foil and cellulose hydrate foils, each impregnated in its mass with sensitizing material adhesively attached to each face of said metal foil.

4. As an article of manufacture, a photographic film including a foil made of cellulose hydrate, sensitized throughout its mass, a very thin metallic foil adhesively attached to said first named foil, and a paper foil adhesively attached to the metal foil.

5. As an article of manufacture, a photographic film consisting of a foil of cellulose hydrate, sensitized throughout its mass, a very thin metal foil adhesively attached to one face of the cellulose hydrate foil, and a paper carrier for said metal foil adhesively attached thereto, the uncovered face of the cellulose hydrate foil being coated with a protective transparent material.

6. As an article of manufacture, a photographic film consisting of a foil of cellulose hydrate, a carrying foil adhesively attached thereto, and a transparent protective coating on that face of the cellulose hydrate foil not covered by said carrying foil.

LEOPOLD RADO.